UNITED STATES PATENT OFFICE.

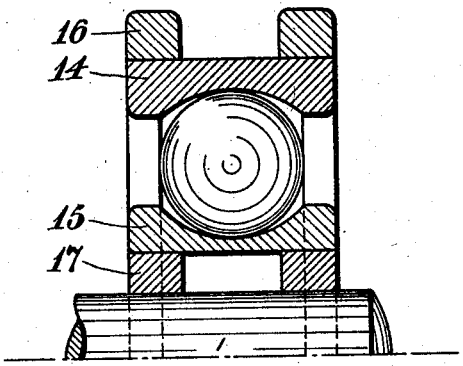

KARL OSKAR LEON, OF STOCKHOLM, SWEDEN.

BALL-BEARING.

1,387,993.         Specification of Letters Patent.     Patented Aug. 16, 1921.

Original application filed November 25, 1918, Serial No. 264,068. Divided and this application filed January 5, 1920. Serial No. 349,649.

(GRANTED UNDER THE PROVISIONS OF THE ACT OF MARCH 3, 1921, 41 STAT. L., 1313.)

*To all whom it may concern:*

Be it known that I, KARL OSKAR LEON, a subject of the King of Sweden, residing at Stockholm, in the Kingdom of Sweden, have invented a new and useful Improvement in Ball-Bearings, (for which I have filed applications in Sweden, Nov. 8, 1917, No. 3,615/1917, No. 47,896, Nov. 10, 1920; Sweden, June 10, 1918, No. 2,232/1918, a division of No. 3,615/1917; Germany, Nov. 7, 1918, No. L47,396; Austria, Nov. 11, 1918, No. A6,372/1918; Great Britain, Nov. 27, 1918, No. 19,613/1918; Italy, Nov. 29, 1918, No. 263-132; France, Dec. 11, 1918, No. 106,528, patented May 10, 1919, No. 493,756,) of which the following is a specification.

The present invention relates to ball bearings of the type which is provided with resilient races supported on either side of the tracks or surfaces contacting with the balls. In my co-pending application, Serial No. 264068, of which this is a division, I have described a ball bearing of the said type which is broadly characterized by this that one of the races or both races, which are provided in known manner with grooves formed in their tracks, has or have such varying or non-uniform thickness as to become resilient at the said grooves. By this arrangement it is possible to make ball bearings provided with such resilient races in a simple and practical manner, as the races my be manufactured in similar manner to that now applied to the manufacture of rigid races with the one exception that at the track or bearing surface for the balls the races are given such a corresponding smaller thickness that the races become resilient at this point. This is effected, according to my present improvement, by making the surfaces of the races opposite the tracks cylindrical and by placing rings around or within these surfaces on either side of the tracks or bearing surfaces for the balls.

In the accompanying drawing an axial section of one-half of a ball bearing embodying the present improvement is shown by way of example.

In the embodiment illustrated in the drawing the races 14 and 15 which are of the usual grooved type and have non-uniform thickness, are made so thin that at the bearing surfaces or the tracks for the balls the races become resilient. To make it possible for the races to yield and exert spring action they are supported by rings 16 and 17 when mounting the bearing in place.

It is to be understood that the invention is not limited to the embodiment above described and illustrated in the drawing. It will also be understood that the bearing may also be made in such manner that only one of the races of the bearing is resilient.

I claim:

In a ball bearing, the combination of balls, and races provided with grooves formed in their tracks and having such varying thickness as to become resilient at the said grooves, and flanges consisting of rings fitted to the sides of said races opposite said balls on both sides of said resilient portions of the races.

KARL OSKAR LEON.